(12) United States Patent
Shedden

(10) Patent No.: US 6,965,896 B1
(45) Date of Patent: Nov. 15, 2005

(54) ACTIVE LOG READ I/O BALANCING FOR LOG DUPLEXING

(75) Inventor: John Robert Shedden, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,401

(22) Filed: Jan. 19, 2000

Related U.S. Application Data

(60) Provisional application No. 60/130,221, filed on Apr. 20, 1999.

(51) Int. Cl.[7] .................................................. G06F 7/00
(52) U.S. Cl. ...................... 707/100; 707/4; 707/202; 718/105
(58) Field of Search ................. 707/1–10, 200–206, 707/100–104.1; 711/119–123, 125–126, 711/129–132; 709/104–105, 212–214; 714/5–6; 718/105–106

(56) References Cited

U.S. PATENT DOCUMENTS

| | | | | |
|---|---|---|---|---|
| 4,633,387 A | * | 12/1986 | Hartung et al. | 709/105 |
| 5,495,606 A | | 2/1996 | Borden et al. | 707/3 |
| 5,544,347 A | * | 8/1996 | Yanai et al. | 711/162 |
| 5,581,753 A | | 12/1996 | Terry et al. | 707/201 |
| 5,606,693 A | * | 2/1997 | Nilsen et al. | 707/10 |
| 5,742,792 A | * | 4/1998 | Yanai et al. | 711/162 |
| 5,799,141 A | | 8/1998 | Galipeau et al. | 714/13 |
| 5,832,515 A | * | 11/1998 | Ledain et al. | 707/202 |
| 5,889,935 A | | 3/1999 | Ofek et al. | 714/6 |
| 5,933,838 A | | 8/1999 | Lomet | 707/202 |
| 6,021,408 A | * | 2/2000 | Ledain et al. | 707/8 |
| 6,052,797 A | * | 4/2000 | Ofek et al. | 714/6 |
| 6,173,377 B1 | * | 1/2001 | Yanai et al. | 711/162 |
| 6,289,357 B1 | * | 9/2001 | Parker | 707/202 |

FOREIGN PATENT DOCUMENTS

| | | |
|---|---|---|
| JP | 3003046 A | 1/1991 |
| JP | 7244642 A | 9/1995 |

OTHER PUBLICATIONS

IBM Technical Disclosure Bulletin, vol. 28, No. 10, Mar. 1986, pp. 4642-4650, "Integrated Concurrency and Shared Buffer Coherency Control for Multi-Systems".

* cited by examiner

*Primary Examiner*—Shahid Alam
*Assistant Examiner*—Jean Bolte Fleurantin
(74) *Attorney, Agent, or Firm*—Ohlandt, Greeley, Ruggiero & Perle, L.L.P.; Ingrid M. Foerster

(57) ABSTRACT

The invention is embodied in a method for enabling improved access to data stored in a log of a computer memory system, wherein the computer memory system has multiple copies of said log, i.e., a primary log and a secondary log. Each log stores data transactions with a database system stored on the computer memory system. The method initially responds to a process request for access to a log, by determining a parameter indicative of demand for access to one of the copies of the log. If the parameter has reached a threshold value, accessing processes are thereafter distributed between the primary and secondary copies of the log so as to balance the work dispatched to the respective log copies. The invention is implemented by a computer system and may also be incorporated into a memory media device such as a magnetic disk.

18 Claims, 2 Drawing Sheets

ACTIVE LOG READ I/O BALANCING FOR LOG DUPLEXING

Priority is herewith claimed under 35 U.S.C. §119(e) from U.S. Provisional Application No. 60/130,221, filed Apr. 20, 1999, by John R. Shedden, and entitled "ACTIVE LOG READ I/O BALANCING FOR LOG DUPLEXING". The disclosure of this Provisional Patent Application is incorporated by reference herein in its entirety.

FIELD OF THE INVENTION

This invention relates in general to computer-implemented database systems, and, in particular, to use of dual copies of logs.

BACKGROUND OF THE INVENTION

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD), such as magnetic or optical disk drives for semi-permanent storage.

A table is assigned to a tablespace. The tablespace contains one or more datasets. In this way, the data from a table is assigned to physical storage on DASD. Each tablespace is physically divided into equal units called pages. The size of the tablespace's pages is based on the page size of the buffer pool specified in the tablespace's creation statement. The bufferpool is an area of virtual storage that is used to store data temporarily. A tablespace can be partitioned, in which case a table may be divided among the tablespace's partitions, with each partition stored as a separate dataset. Partitions are typically used for very large tables.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to modify the data and as the data is being modified, all operations on the data are logged in a log file.

When a primary copy of a database is corrupted, for example, due to a system or media failure, or when a user wants to remove modifications to the data (i.e., back out the changes), the primary copy of the database is recovered by applying changes found in the log to a secondary copy of the database. That is, through use of the log file, the copied data is modified, based on the operations and data found in the log file.

Typically, for database systems, it is recommended that dual copies (duplex) of the log be maintained to prevent a single point-of-failure. The recommendation is to maintain the secondary copy of the log on a separate I/O path from the primary copy of the log. In the event of a failure reading the primary copy of the log, the secondary copy of the log is used to satisfy the request.

Normally, all log read requests are directed to the primary copy of the log, reserving the secondary copy of the log for error recovery. However, in the case where a system failure has occurred, but the primary copy of the log remains accessible, a number of recovery tasks often run in parallel. Accordingly, it often occurs that there are a number of substantially concurrent requests to the log. This action results in a queuing of the requests and a delay in the recovery action.

It is therefore an object of this invention to remove a system recovery bottleneck that is presented when too many requests to the log are queued.

It is another object of the invention to provide a method for more efficient use of the secondary copy of the log.

SUMMARY OF THE INVENTION

The invention is embodied in a method for enabling improved access to data stored in a log of a computer memory system, wherein the computer memory system has multiple copies of said log, i.e., a primary log and a secondary log. Each log stores data transactions with a database system stored on the computer memory system. The method initially responds to a process request for access to a log, by determining a parameter indicative of demand for access to one of the copies of the log. If the parameter has reached a threshold value, accessing processes are thereafter distributed between the primary and secondary copies of the log so as to balance the work dispatched to the respective log copies. The invention is implemented by a computer system and may also be incorporated into a memory media device such as a magnetic disk.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration, a specific embodiment in which the invention may be practiced. It is to be understood that other embodiments may be utilized without departing from the scope of the present invention.

Hardware Environment

Figure 1:
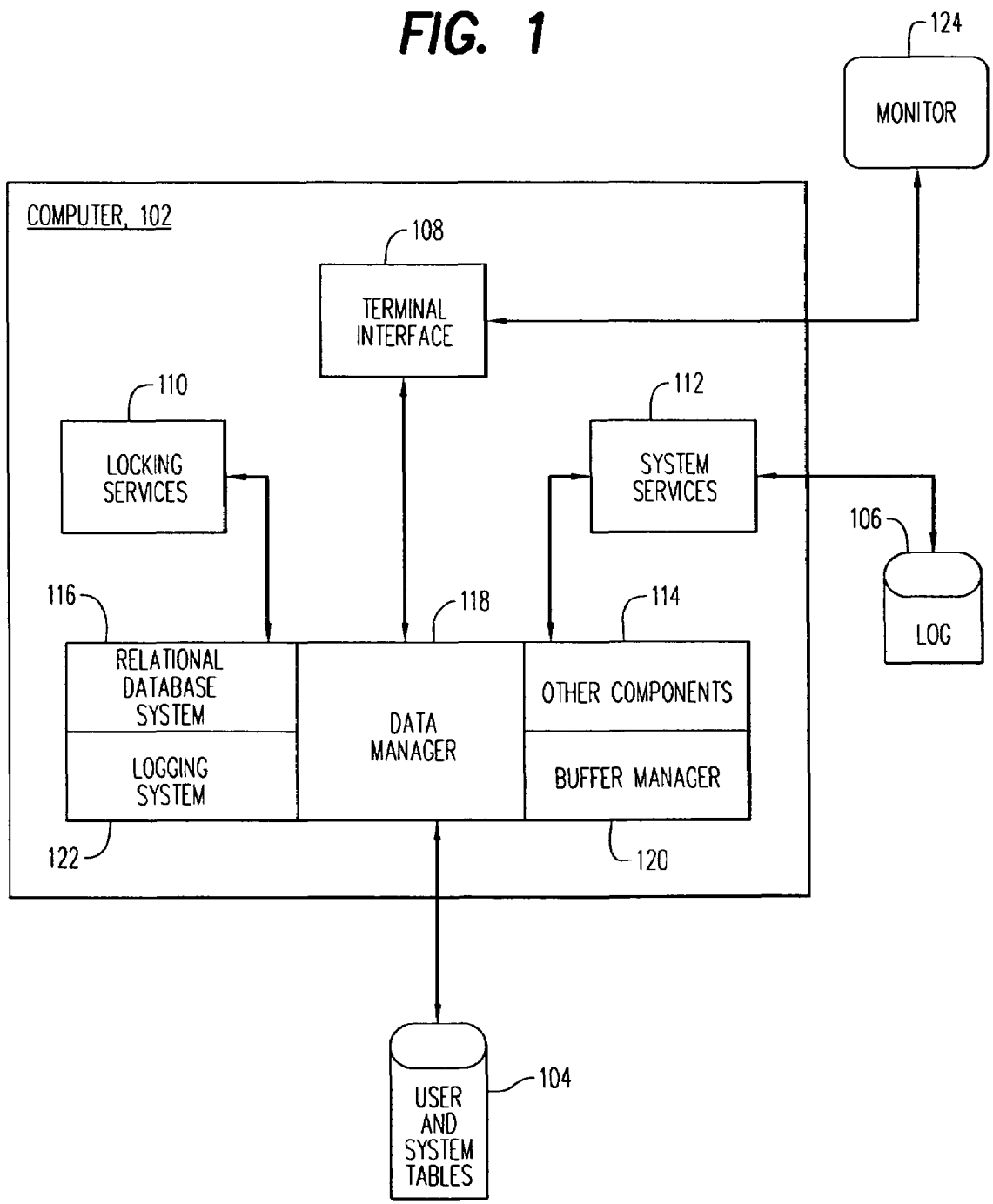
FIG. 1 illustrates an exemplary computer hardware environment that implements the present invention.

FIG. 1 illustrates an exemplary computer hardware environment that implements the present invention. Computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of computer system 102 use a standard operator interface 108, such as IMS/DB/DC®, CICS®, TSO®, OS/390®, ODBC® or other similar interface, to transmit electrical signals to and from computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface allows users to formulate relational operations on the tables either interactively, in batch files, or embedded in host languages, such as C and COBOL. SQL allows the user to modify the data. In the preferred embodiment of the present invention, the RDBMS software comprises the DB2® product offered by IBM for UDB ("Universal Database") for the OS/390® operating system. Those skilled in the art will recognize, however, that the present invention has application to any RDBMS software, whether or not the RDBMS software uses SQL.

As illustrated in FIG. 1, the DB2® system for UDB for the OS/390® operating system includes three major components: Internal Resource Lock Manager (IRLM) 110, Systems Services module 112 and Database Services module. IRLM 110 handles locking services for the DB2® system, which treats data as a shared resource, thereby allowing any number of users to access the same data simultaneously. Thus concurrency control is required to isolate users and to maintain data integrity.

Systems Services module 112 controls the overall DB2® execution environment, including managing log data sets 106, gathering statistics, handling startup and shutdown, and providing management support. At the center of the DB2® system is Database Services module 118 that contains plural submodules, including Relational Database System (RDS) 116, Data Manager 118, Buffer Manager 120, Logging System 122 and other components 114 such as an SQL compiler/interpreter. These submodules support the functions of the SQL language, i.e. definition, access control, interpretation, compilation, database retrieval, and update of user and system data.

The present invention is generally implemented using SQL statements executed under the control of Database Services module 118. Database Services module 118 retrieves or receives the SQL statements, wherein the SQL statements are generally stored in a text file on data storage devices 104 and 106 or are interactively entered into computer system 102 by an operator at monitor 124 via operator interface 108. Database Services module 118 then derives or synthesizes instructions from the SQL statements for execution by computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by computer system 102, cause computer system 102 to perform the steps necessary to implement and/or use the present invention. Under control of an operating system, the RDBMS software, the SQL statements, and the instructions derived therefrom, may be loaded from data storage devices 104 and 106 into a memory of computer system 102 for use during operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product" or "memory media") as used herein is intended to encompass a computer program accessible from any computer-readable device, carrier, or media. Of course, those skilled in the art will recognize many modifications may be made to this configuration without departing from the scope of the present invention.

Active Log I/O Balancing for Log Duplexing

The present invention provides a logging system 122 for reducing I/O device contention for the primary copy of a log. The invention reduces the time required to recover from media or system failures.

Figure 2:
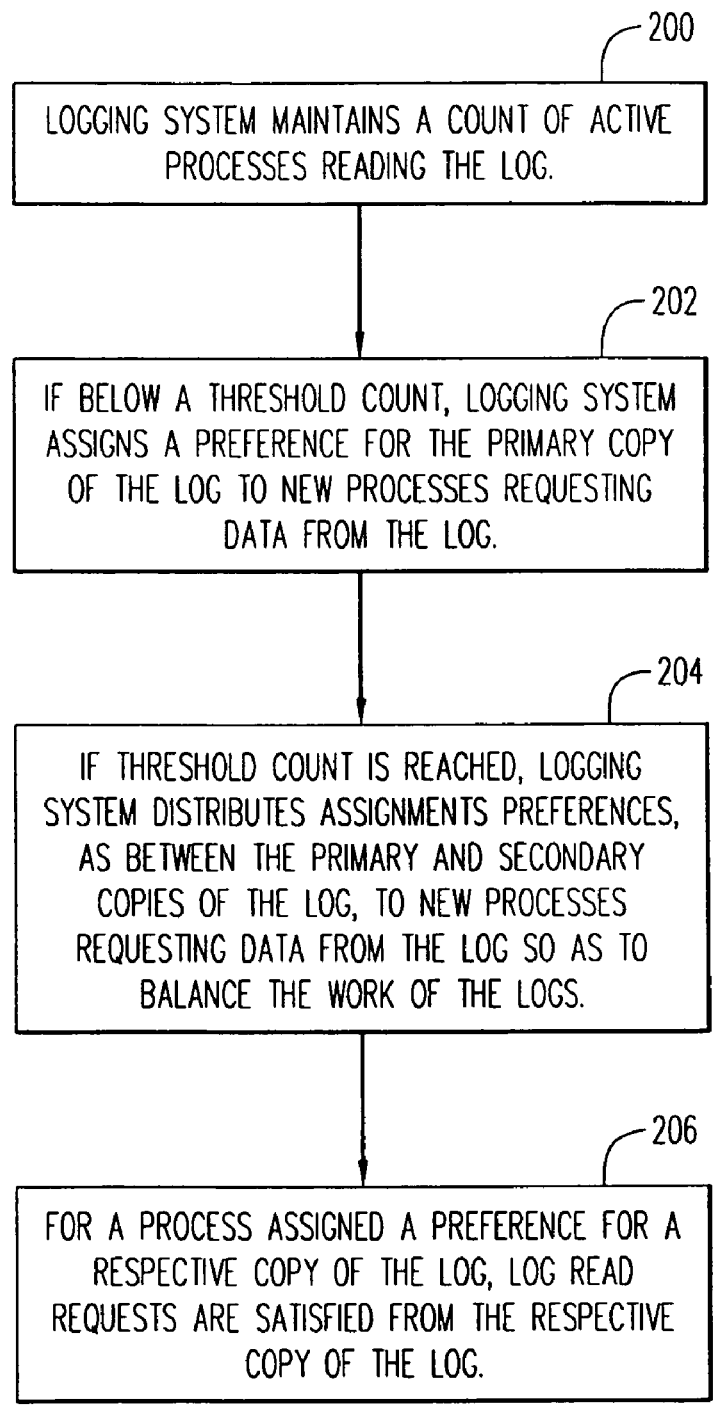
FIG. 2 is a high level flow diagram that illustrates the method of the invention.

In some recovery scenarios (e.g., recovering from a database media failure), there may be a number of processes concurrently reading from the primary copy of the log. This may generate I/O contention for the device(s) containing the primary copy of the log. As indicated above, this will extend the recovery period. Logging system 122 relieves some of the device contention by satisfying a portion of the log read requests from the secondary copy of the log in periods of concurrent log read activity. In the embodiment illustrated in the logic flow diagram of FIG. 2, logging system 122 maintains a count of active processes reading the log (step 200). If the count is below a threshold count, logging system 122 assigns a preference for the primary copy of the log to new processes requesting data from the log (step 202).

If the threshold count is reached, logging system 122 distributes preference assignments between the primary copy of the log and the secondary copy of the log, in respect of new processes requesting data from the log (step 204). It is preferred that the preference assignments be alternated as between the log copies so as to balance the work of the respective logs and reduce possible delay times. For a process assigned a preference for the respective copy of the log, log read requests are satisfied from the respective copy of the log (step 206). This action reduces queuing time and quickens system recovery time.

The foregoing description of the preferred embodiment of the invention has been presented for the purposes of illustration and description. It is not intended to be exhaustive or to limit the invention to the precise form disclosed. Many modifications and variations are possible in light of the above teaching. For example, instead of keeping count of processes attempting to access the primary log, a count of requests that have been queued to the primary log may be used. It is intended that the scope of the invention be limited not by this detailed description, but rather by the claims appended hereto.

What is claimed is:

1. A method for enabling improved access to data from a computer memory system during a data recovery operation, said computer memory system having said data in a first log, and a copy of said data in a second log, the method comprising the steps of:

a) responding to a process request to read said data from said first log, by determining a parameter indicative of demand for access to read said first log; and b) assigning the process to read said copy of said data from said second log if said parameter has reached a threshold value, wherein said process is one of a plurality of processes concurrently attempting to read said first log during said data recovery operation.

2. The method as recited in claim 1, wherein said first log is a primary log.

3. The method as recited in claim 1, wherein said parameter is a count of said plurality of processes assigned to said first log.

4. The method as recited in claim 3, wherein, when said count of said plurality of processes assigned to said first log reaches a predetermined threshold, step b) distributes new process assignments to both said first log and said second log in an attempt to balance work of said first and second logs.

5. The method as recited in claim 3, wherein, when said count of said plurality of processes assigned to said first log reaches a predetermined threshold, step b) alternates new process assignments to said first log and said second log in an attempt to balance work of said first and second logs.

6. The method as recited in claim 1, wherein said parameter is a count of requests that have been queued to said first log.

7. A memory media including instructions for controlling a computer to enable improved access to data from a memory system during a data recovery operation, said memory system having said data in a first log and a copy of said data in a second log, the memory media comprising:
   a) means for controlling said computer to respond to a process request to read said data from said first log, by determining a parameter indicative of demand for access to read said first log; and
   b) means for controlling said computer to assign the process to read said copy of said data from said second log if said parameter has reached a threshold value,
   wherein said process is one of a plurality of processes concurrently attempting to read said first log during said data recovery operation.

8. The memory media as recited in claim 7, wherein said first is a primary log.

9. The memory media as recited in claim 7, wherein said parameter is a count of said plurality of processes assigned to said first log.

10. The memory media as recited in claim 9, wherein, when said count of said plurality of processes assigned to said first log reaches a predetermined threshold, means b) controls said computer to distribute new process assignments to both said first log and said second log in an attempt to balance work of said first and second logs.

11. The memory media as recited in claim 9, wherein, when said count of said plurality of processes assigned to said first log reaches a predetermined threshold, means b) controls said computer to alternate new process assignments to said first log and said second log in an attempt to balance work of said first and second logs.

12. The memory media as recited in claim 7, wherein said parameter is a count of requests that have been queued to said first log.

13. A computer system that enables improved access to data from a memory system during a data recovery operation, said memory system having said data in a first log and a copy of said data in a second log, the computer system further comprising:
   a) means for determining a parameter indicative of demand to read said first log; and
   b) logging means responsive to a process request to read said data from said first log, by assigning the process to read said data from said second log if said parameter has reached a threshold value,
   wherein said process is one of a plurality of processes concurrently attempting to read said first log during said data recovery operation.

14. The computer system as recited in claim 13, wherein said first log is a primary log.

15. The computer system as recited in claim 13, wherein said parameter is a count of said plurality of processes assigned to said first log.

16. The computer system as recited in claim 15, wherein said logging means, when said count of said plurality of processes assigned to said first log reaches a predetermined threshold, distributes new process assignments to both said first log and said second log in an attempt to balance work of said first and second logs.

17. The computer system as recited in claim 15, wherein said logging means, when said count of processes assigned to said first log reaches a predetermined threshold, alternates new process assignments to said first log and said second log in an attempt to balance work of said first and second logs.

18. The computer system as recited in claim 13, wherein said parameter is a count of requests that have been queued to said first log.

\* \* \* \* \*